United States Patent [19]

Bschorr

[11] 4,232,762

[45] Nov. 11, 1980

[54] WIDE-BAND VIBRATION DAMPER

[75] Inventor: Oskar Bschorr, Munich, Fed. Rep. of Germany

[73] Assignee: Messerschmitt-Bolkow-Blohm GmbH, Munich, Fed. Rep. of Germany

[21] Appl. No.: 927,388

[22] Filed: Jul. 24, 1978

Related U.S. Application Data

[63] Continuation-in-part of Ser. No. 722,128, Sep. 10, 1976, Pat. No. 4,120,382.

[51] Int. Cl.³ .......................... F16F 7/00; F16L 55/02
[52] U.S. Cl. ........................................ 188/1 B; 138/26
[58] Field of Search .................... 138/26, 28; 188/1 B, 188/1 C; 267/62, 90, 93–95, 103, 151, 160; 181/207–209

[56] References Cited

U.S. PATENT DOCUMENTS

| 360,326 | 3/1887 | Richert | 138/26 |
|---|---|---|---|
| 380,651 | 4/1888 | Fowler et al. | 267/62 |
| 1,638,782 | 8/1927 | Paton | 188/1 B X |
| 2,179,959 | 11/1939 | Schroedter | 188/1 B X |
| 2,429,297 | 10/1947 | Rudolph | 138/26 |
| 2,689,105 | 9/1954 | Zimmer | 188/1 B X |
| 2,722,194 | 11/1955 | Hoffman | 188/1 B X |
| 2,751,179 | 6/1956 | Oravec | 267/22 X |
| 3,144,228 | 11/1964 | Kass | 188/1 B X |
| 3,159,249 | 12/1964 | Lazan | 188/1 B |
| 3,800,909 | 4/1974 | Duncanson et al. | 181/207 |
| 4,039,050 | 8/1977 | Bowling et al. | 188/1 B |

FOREIGN PATENT DOCUMENTS 542047  3/1977  U.S.S.R. .................................. 267/160

OTHER PUBLICATIONS

Anti–Vibration Mountings, *The Railway Gazzette*, vol. 119, No. 20, Nov. 15, 1963, p. 555.

*Primary Examiner*—Duane A. Reger
*Attorney, Agent, or Firm*—W. G. Fasse; D. F. Gould

[57] ABSTRACT

A wide-band vibration damper for damping sound propagating in a solid body includes at least one horn member having a broad end or side and a tapering end. The broad horn side or end is rigidly connected to the solid body which is to be dampened in its vibration. The tapering end of the horn member is connected to a supporting rigid point through a damping material such as a foam material or the like.

22 Claims, 16 Drawing Figures

WIDE-BAND VIBRATION DAMPER

CROSS REFERENCE TO RELATED APPLICATIONS

The present application is a Continuation-In-Part application of my copending application U.S. Ser. No. 722,128, filed Sept. 10, 1976, now U.S. Pat. No. 4,120,382 issued Oct. 17, 1978.

BACKGROUND OF THE INVENTION

The invention relates to a wide-band vibration damper for reducing sound conducted in solids, with a horn part which can be fastened with its broad side to the body to be damped, in a positive force transmitting manner or in a force and moment transmitting manner, whereby sound waves conducted in solids may propagate in the horn part in its longitudinal direction and that the cross section of the horn part is tapered in such a manner that the spectral point impedance and the moment impedance relative to the fastening point of the vibration damper, and the coupling factor are adjusted in a manner known as such, while the tapered end of the horn member is terminated in a reflection free manner.

Such a vibration damper is capable of reducing vibrations conducted in solids, particularly such vibrations which emanate from wall elements whereby the vibration damper can vibrate in up to all six degrees of freedom. It may contain curved, helical or twisted horn parts as vibration conductors, the cross section of which is tapered in the direction of propagation in a manner known per se and which horn parts are damped. The impedance matrix of such elements comprises coupling members between the individual degrees of freedom of the vibration.

OBJECTS OF THE INVENTION

In view of the above, it is the aim of the invention to achieve the following objects, singly or in combination:

to improve a wide-band vibration damper in such a manner that it radiates less sound than prior art devices and that it provides a better sound shielding effect;

to increase the sound insulating effect by providing the horn member with relatively stiff walls in the lower frequency range, whereby these walls of the horn member shall be self-supporting;

to connect the broad ends of the horn members to the structure, the sound or noise of which is to be dampened; and to divide the vibration attenuation into two parts, whereby one attenuation proportion takes place in the horn member and another proportion takes place by the damping means used to connect the tapered end of the horn member to a fixed point.

SUMMARY OF THE INVENTION

According to the invention there is provided a wide-band vibration damper for damping sound or noise propagating in a solid body which comprises horn means, also referred to herein as vibration conductors, including a broad side or wide end and a tapering end. The broad or wide horn end is connected to the solid body, the vibration of which is to be damped, by rigid connecting means. The narrow or tapering end is connected to a fixed supporting point by a damping material such as foam material or the like.

The body to be damped or the base of the horn part may serve as support points for the horn member. The tapered cross section of the horn part or vibration conductor acts as a transformer which transforms the input vibration into large excursions but small vibration forces. Therefore, the velocity-proportional damping member can support itself, due to the reduced forces which are effective on the component to be damped or on parts adjacent to the vibration damper. It has been found advantageous if the damping factor or constant of the damping material is equal or approximately equal to the termination impedance of the horn part.

In order to increase the sound insulating effect by the wall stiffness in the lower frequency range and to obtain at the same time self-supporting wall elements, the new vibration damper is further characterized by contiguous, linear or areal horn members which are attached to the body to be damped in such a manner that the stiffness of the overall structure is increased. In order to increase the impedance for a given frequency, the invention teaches to only partly attenuate the vibration in the horn part and to provide further attenuation where the tapered end of the horn means is connected to a support by means of a damping material.

According to a further feature of the invention, the spectral impedance is influenced by the termination of the vibration damper. To obtain, for instance, resonance peaks, a termination is provided which is not free of reflection. This is achieved by attenuating the vibration in the horn part only incompletely, for peaking the impedance at given frequencies. However, it may also be advantageous to provide stiffness steps in the horn part. To preclude intercoupling in the case of curved horn parts, two mirror-symmetrical horn parts are joined together. According to the invention, the same effect can be accomplished, however, by symmetrically joining together four helical horn parts along two axes. Incidentally, where the present disclosure refers to solid horn members, it means that the entire horn member is solid and does not have any hollow portions.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS

Figure 1:
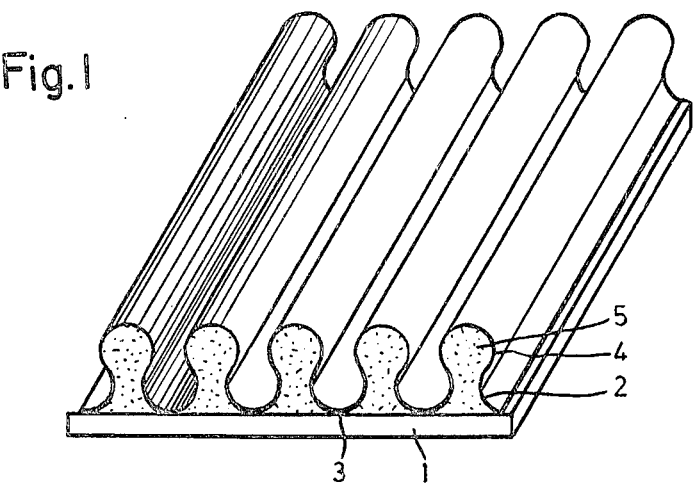
FIG. 1 is a wall element with a corrugated, wavy vibration damper.

FIG. 1 shows a wall element, comprising the cover wall 1 and a corrugated vibration damper 2 in the form of horn members 4. The latter are connected to the cover wall 1 by fasteners 3, e.g., rivets, spot welds, or the like. The cross sectional pattern and the radius of curvature of the vibration dampers 2 or the horn members 4 are designed in accordance with the required impedance matrix relative to the fasteners 3. The horn members 4 are made of a material with high internal damping such as lead or plastic material. The damping can also be achieved, however, by covering the horn members 4 with attenuating coatings or by foaming the cavities produced by the corrugations with damping materials 5.

If a sound wave strikes the cover wall 1, the motion caused by the sound wave in the direction normal to the wall 1, is introduced through the fasteners 3 into the horn members 4. The motion in the direction of the normal propagates essentially as a flexure wave in the direction of the tapered cross section of each horn member. Due to the tapering of the cross section, the velocity of propagation is reduced, and thereby the wave length of the flexural vibration is also reduced, whereby the necessary attenuation path length is decreased accordingly. The damping effect of the wall element is independent of the side and the angle of incidence of the sound wave. In order to reduce, particularly in the case of machinery housings or the like, the reverberation of the interior of the housing, it is advantageous to line the latter with absorbing material in a manner known per se.

The wall element according to FIG. 1 has great stiffness in the direction of the corrugated horn members 4, while it is relatively flexible in the transversal direction. In order to obtain high flexural strength also in the transversal direction, ribs may be used, or two wall elements with mutually perpendicular corrugations may be joined together crosswise.

Figure 2:
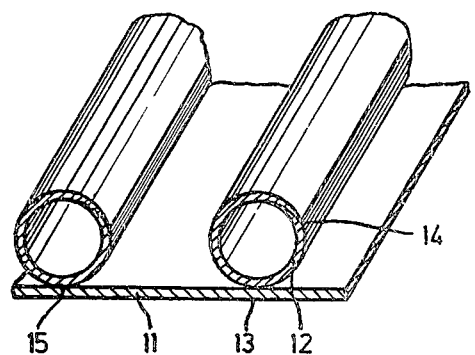
FIG. 2 is a wall element with rolled vibration dampers, whereby the tapering edges are interconnected so that the dampers form tubular members.

The wall element according to FIG. 2, comprises a cover wall 11 and rolled horn parts 12. The latter are fastened to the cover wall 11 in the area 13. As seen from the fastening point 13, the cross section of the horn part 12 tapers toward both sides. The free ends 14 overlap and are connected to the fastening point 13 or the base of the horn part 12 via a viscous attenuating coating 15. If the damping factor of the attenuating coating 15 is matched to the impedance of the free end 14, the vibrating motion of the latter can be attenuated over a short distance. Owing to the transformer action of the cross-sectional tapering, the vibration forces at the free end 14 are reduced so that the reaction of the latter is insignificant.

Figure 3:
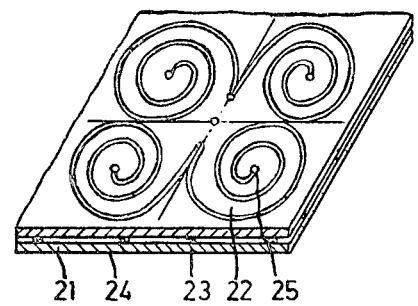
FIG. 3 is a wall element with spiral vibration dampers, whereby the tapering ends are connected to the wall.

FIG. 3 shows an example embodiment with spiral horn members 22, which are attached to a cover wall 21 by the fasteners 23. The spiral arms 24 of the horn members 22 have a certain distance from the cover wall 21 and also from each other so that they can vibrate freely. The cross-section pattern (width and thickness of the spiral arms 24) and the curvature depend on the required impedance matrix. Contrary to the example embodiments of FIGS. 1 and 2, the spiral horn members 22 are additionally excited to execute torsion vibrations.

In order to eliminate couplings between the individual degrees of freedom of the vibration which might be troublesome, four horn members 22 are advantageously joined together in such a manner that symmetry with respect to the two axes results. In this manner, the coupling factors mutually cancel each other and a damping, free of coupling, is obtained in the direction of the normal to the cover wall 1.

The horn members 22 are made of a material having a high internal damping, or they are provided with damping coatings. Advantageously, these are applied between the individual turns of the spirals, so that the damping is obtained due to the relative motion of the turns of the spirals with respect to each other. In order to increase the impedance, two or more story layers of horn members 22 are possible. In order to reduce the spacing of the fastening points 23, the individual layers are arranged in staggered fashion. In order to obtain resonance peaking of the impedance matrix, the horn members 22 may have end masses 25. Resonance peaking can be achieved in general by not reflection-free terminations.

Figure 4:
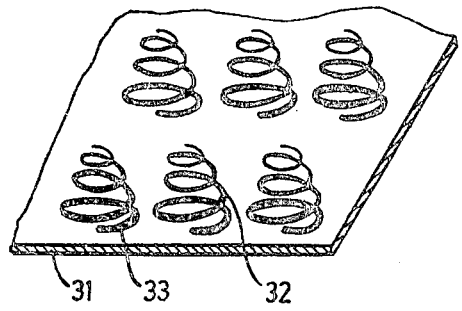
FIG. 4 is a wall element with helical vibration dampers, wherein the tapering free ends may be connected to a support.

The example embodiment according to FIG. 4 is substantially analogous to that of FIG. 3. Helical horn members 32 are attached by means of fasteners 33 on a covering skin 31. The horn members 32 may be made of wire or bristles. The covering skin 31 may be flexible, with the horn members 32 accordingly arranged close together. The skin 31 may be made of foil or an air-impervious fabric. Such an embodiment is suited particularly as a noise curtain. The cross-section and stiffness reduction of the horn members 32 can be achieved also by combining several individual bristles of different length. The mutual friction of the individual bristles increases simultaneously the vibration damping.

Figure 5:
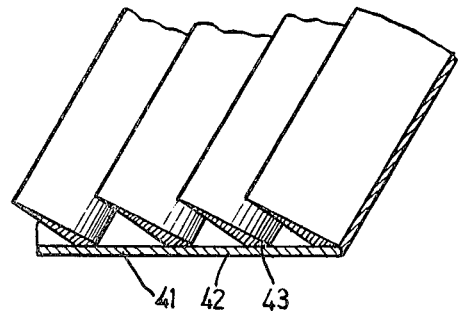
FIG. 5 is a wall element with scale-like vibration dampers, each scale having a tapering edge for connection to a fixed point by a damping material.

FIG. 5 represents an example embodiment with horn members 42 arranged in fish scale fashion. These members 42 are attached to a cover wall 41 for positive transmission of force and moment. To increase the number of degrees of freedom, horn parts of spiral design according to the embodiment of FIG. 3, can be used instead of the horn members 42.

Figure 6:
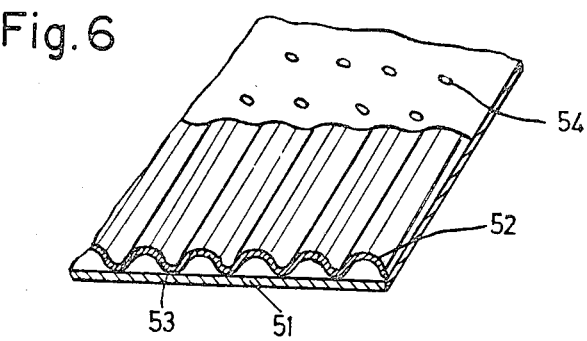
FIG. 6 is a wall element with a flat, corrugated vibration damper.

In the example embodiments of FIGS. 1 to 5, the desired cross-section pattern of the horn members 2, 12, 22, 32 and 42 was essentially obtained by virtue of thickness and/or width. In the example embodiment of FIG. 6, the bending stiffness of the vibration damper in the direction of the propagation is reduced. This is achieved because the individual horn members 52 have a waviness which decreases in the direction of propagation, whereby the wave length of the vibrations introduced by the cover wall 51 via the fastening points is also decreased. The air cushioning between the cover wall 51 and the horn member 52 may be reduced by equalization holes 54. The spectral impedance matrix may also be influenced by the size and arrangement of the equalization holes. In particular, resonance peaking is possible thereby. If the equalization holes 54 have fine pores, the forced air motion can at the same time be used as a velocity-proportional damping mechanism. The same effect is also achieved by damping materials between the horn member 52 and the cover wall 51 to be damped. The principle of changing the stiffness as applied in FIG. 6, may logically be used also in lieu of the cross section tapering in FIGS. 1 to 5.

Figure 7:
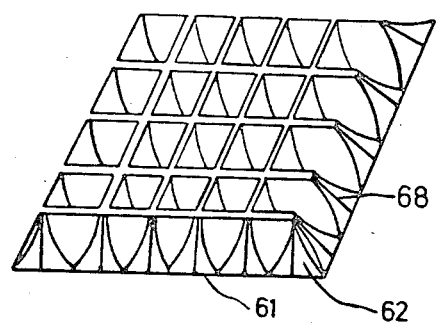
FIG. 7 is a wall element with an integrated vibration damper.

In FIG. 7, a wall element is shown which comprises a cover layer 61 and horn members 62 placed thereon. The horn members 62 form a cross-braced structure in the manner shown. For better attenuation, continuous sheet metal strips 68 of a material with a larger coefficient of elasticity than the horn members 62 are provided in the latter. These strips are connected to the cover layer 61, so that rapid attenuation is obtained due to the relative motion, particularly in the tapered portion of the horn member. Because of the cross-bracing of the sheet metal strips 68, the stiffness of the cover wall 61 is additionally increased. If the horn members 62 are made of open-pore material, or coated with such, air-borne sound absorption can be obtained in the manner of the λ/4 wedges.

Figure 8:
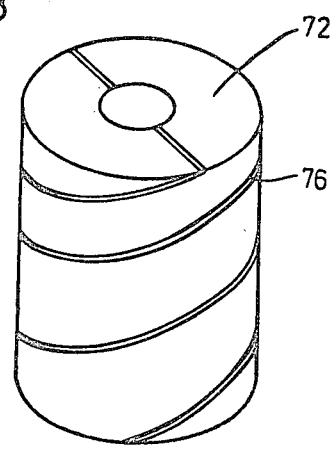
FIG. 8 is a helical vibration damper.

In FIG. 8, an example embodiment with a horn member 72 coiled in the manner of a helical spring, is shown. In order to equalize tilting moments due to intercoupling, it is advantageous to provide two or multi-threaded coils. For damping, a damping coating 76 can be disposed in the spaces between the horn members 72.

Figure 9:
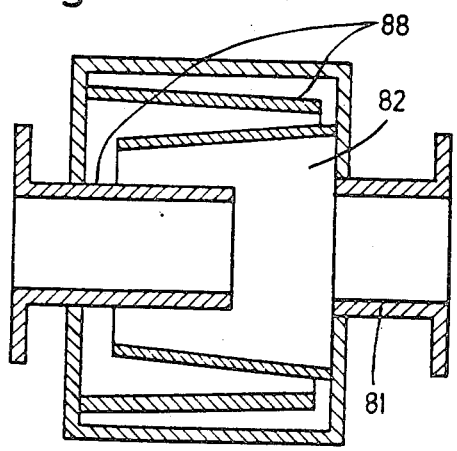
FIG. 9 is a vibration damper for hydraulic lines.

FIG. 9 shows an example embodiment for damping hydraulic lines and the like. The horn member 82 is disposed in the line section 81. The horn member 82 is formed by concentric rings 88, the dimensions of which are chosen so that the cross section area of the ring gaps becomes continuously smaller in alternately opposite directions. The ring gaps are connected to the line section 81 and are likewise filled with the working fluid. Vibrations of the working fluid, caused by pumps or consumers, also propagate in the horn member 82; they are concentrated on the smaller area by the narrower gap cross sections and are damped. Instead of the free connection of the line section 81 and the horn member 82, a covering in the form of a diaphragm can also be provided.

In the example embodiments of FIGS. 1 to 9, the intended use is primarily for machine installations. The example embodiments shown may also be applied to protect buildings against vibrations, to damp residential noise, etc. Advantageously, the horn members are made of materials common in construction practice, e.g., concrete, and are integrated into the structure. The boundaries of the horn parts and at the same time the pouring form are formed by thin-walled volume-elastic materials such as styrofoam.

Figure 10:
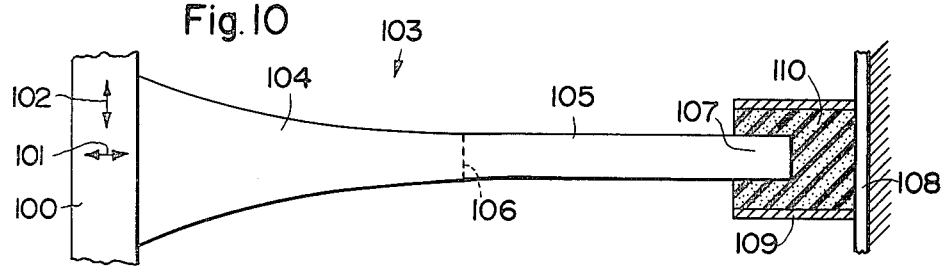
FIG. 10 is an embodiment of the invention in which the horn member of solid material extends substantially perpendicularly to the vibrating solid body.

FIG. 10 illustrates a solid horn member of the invention for damping, for example, a wall panel 100 that may vibrate in the direction indicated by the arrows 101 and 102. In order to dampen these vibrations the invention provides a tapering solid material horn member 103 having a broad side 104 rigidly connected to the wall panels to be dampened, for example, by welding or by adhesive means. The horn member 103 also has a tapering end 105 which may be filled with foam material not shown. The horn members 104 and 105 may be connected to each other, for example, along a seam 106 providing a stiffness step. The outer end 107 of the tapering horn member 105 is operatively connected to a fixed point 108 which may, for example, be the foundation or the floor or the like. The connection is accomplished according to the invention by means of a socket 109 filled with foam material 110 such as styrofoam or the like. The embodiment of FIG. 10 is very effective in the damping of vibrations of the wall panel 100, especially where space considerations are of secondary importance.

Figure 11:
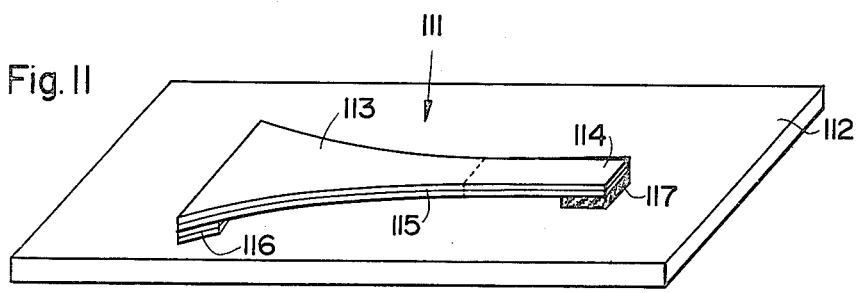
FIG. 11 illustrates an embodiment wherein a relatively flat solid horn member extends substantially in parallel to the vibrating solid body.

FIG. 11 illustrates a space saving flat embodiment of the invention, wherein the entire structure has a flat space saving configuration. Thus, the flat, solid horn member 111 extends substantially in parallel to the wall panel 112 to be dampened. This configuration requires very little space in a direction perpendicular to the plane of the panel 112. The horn member 111 also comprises a broad or wide end 113 and a tapering end 114. The horn member is made of two flat components of a flat material such as steel or aluminium. The two flat sheets are bonded to each other along a surface seam 115. The bonding may be accomplished, for example, by an adhesive such as Patex (Henkel, Germany). The broad end 113 of the horn member 111 is secured to the panel 112 by a viscous damping material 116 such as rubber or polymer. The tapering end 114 of the horn member is operatively connected to the panel through a pad of foam material 117 which may be of the same kind as in FIG. 10 and which is bonded to the horn member end 114 as well as to the panel 112.

Figure 12:
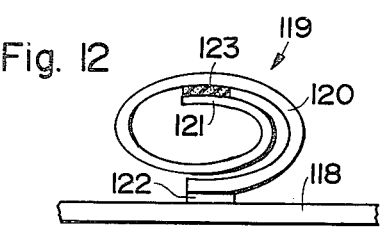
FIG. 12 illustrates an embodiment of the invention wherein a coiled horn member is secured with its tapering end to a point along its own length.

In FIG. 12 the vibrations of the panel 118 are dampened by means of a solid horn member 119 in the shape of a tapering rod having a thicker end 120 and a tapering end 121. The solid rod is wound into a spiral resembling shape and the thicker end 120 is operatively secured to the panel 118 by a block 122 of metal. The tapering end 121 which may be hollow and filled with a foam material is connected to the spiral of the horn member by means of a pad 123 of a vibration absorbing material such as a foam material or the like. The embodiment of FIG. 12 is also space saving, although it is not as flat as the embodiments of FIG. 11, the structure of FIG. 12 requires substantially less space in a direction perpendicularly to the panel 118, than the embodiment of FIG. 10.

Figure 13:
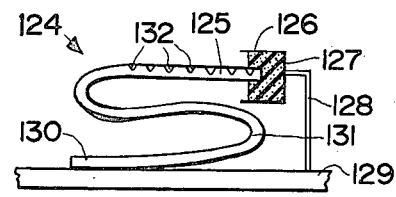
FIG. 13 illustrates an embodiment wherein a snake horn member is connected with its tapering end through a further damper to the vibrating body.

FIG. 13 illustrates an embodiment wherein the horn member 124 is a solid rod which may have various cross sections such as circular or square or rectangular and only a very slight taper may be provided at the end 125 which is secured to a socket 126 through noise absorbing means 127. The socket 126 in turn is rigidly connected to a fixed point by means of rods 128. In the shown embodiment the fixed point may be the vibrating panel 129 itself. The horn member 124 has a broader end 130 which is operatively connected to the panel 129, the vibrations of which are to be dampened. Further, the horn member 124 is bent into an "S" shape 131. The shape of the bending is intended to save space. Further, the tapering end 125 of the horn member 124 is provided with indentations or grooves 132 which may be used for the purpose of determining the frequency of the damping range in which the noise absorber is most efficient.

Figure 14:
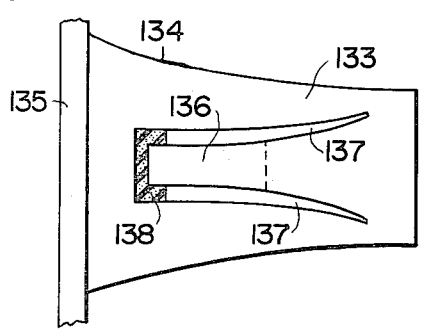
FIG. 14 shows an embodiment wherein for the reduction of the total length of the horn member, the tapering end extends in parallel to the main body of the horn member.

FIG. 14 illustrates an embodiment wherein the solid horn member 133 is again connected with its wide end 134 to the panel 135, the vibrations of which are to be dampened. The tapering end 136 of the horn member is shaped as a cut-out directly out of the horn member 133. Thus, slots 137 cut into the horn member 133 separate the tapering end 136 from the wide end portion of the horn member 133. Further, the tapering end 136 is operatively connected to a fixed point, namely, in this instant the wide end portion of the horn member by means of a sound absorbing material 138. This type of horn construction also results in a relatively flat structure which is substantially shortened as compared, for example, to the embodiment of FIG. 10.

Figure 15:
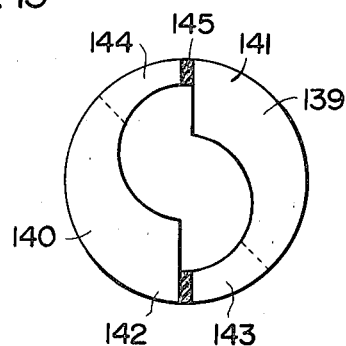
FIG. 15 shows an embodiment of two semi-circular horn members mutually interconnected with the respective tapering end to the respective wide end.

FIG. 15 shows two identical solid horn members 139 and 140 each having a wide end 141 and 142 as well as a tapering end 143 and 144. The two solid horn members are connected to each other by noise absorbing material 145 in such a manner that a closed circle is formed with a tapering end being connected to a wide end. The element, the vibrations of which are to be dampened, is not shown in FIG. 15, but it would be connected to the wide end 141 and 142 of the respective horn members.

Figure 16:
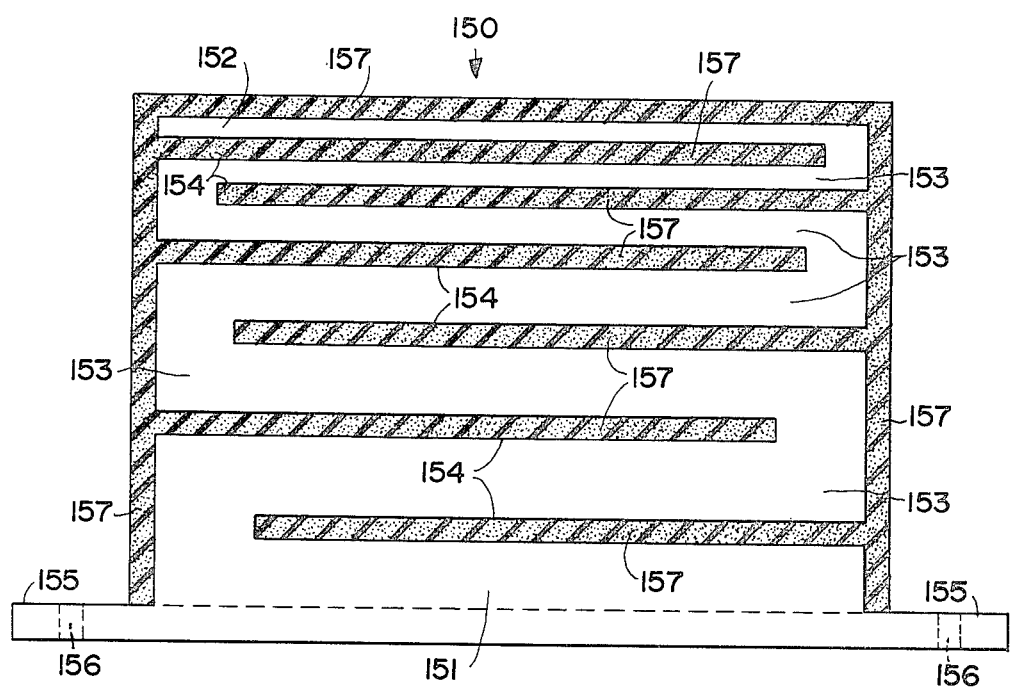
FIG. 16 is a side view, partially in section, of a solid material horn member with meandering legs embedded in a foam material.

FIG. 16 shows a further embodiment of a solid horn member 150 having a wide end 151 and a narrow end 152. Intermediate the ends, meandering legs 153 are formed, for example, by sawing or milling slots 154 into a block of solid material such as aluminum. The legs 153 may taper from the wide end 151 to the narrow end 152. The wide end 151 may be provided with flanges 155 forming a base with holes 156 therein for rigidly securing the horn member 150 to a body to be damped. The gaps 154 are filled with a foam rubber type damping material 157 such as polyurethane foam forming intermediate masses between the legs 153. All the sides of the horn member may also be covered by such foam damping material 157 which reaches down to the flanges 155 whereby the tapering end 152 is connected through sound absorbing material 157 to a fixed point, namely the body to be damped (not shown).

It has been found that the present invention is a very effective expedient for damping industrial noises. For example, by attaching the noise absorber of FIG. 16 to railroad wheels the normally occurring noise of 96 db could be reduced down to 88 db which is considered a breakthrough having regard to the long standing efforts of those skilled in the art to reduce the noise of railroad wheels. Incidentally suitable dimensions for an aluminum block to be made into the absorber of FIG. 16, could be, for example, 2 cm wide, 8 cm high, and 12 cm long.

Although the invention has been described with reference to specific example embodiments, it will be appreciated, that it is intended to cover all modifications and equivalents within the scope of the appended claims.

What is claimed is:

1. A wide-band vibration damper for damping sound propagating in a solid body, comprising sound vibration conductor means, the entire volume of which is solid material, said sound vibration conductor means having a first larger end and a second smaller end, said first larger end having a larger dimension than said second smaller end, whereby said solid material volume has a cross-section which diminishes from said first larger end to said second smaller end, said first larger and second smaller end being interconnected entirely by said solid material so that sound vibrations travelling from said first larger end to said second smaller end must travel entirely through said solid material volume, first means connecting said first larger end to said solid body for introducing sound vibrations into said solid material volume, support means located near said second smaller end, and damping material means operatively connecting said second smaller end to said support means for introducing sound vibrations in a damped manner into said support means, whereby said vibration conductor due to its diminishing cross-section transforms the sound vibrations into large excursions but small vibration forces.

2. The wide-band vibration damper of claim 1, wherein said support means are an integral part of the solid body to be damped.

3. The wide-band vibration damper according to claim 1, wherein said solid vibration conductor means comprise a base serving as the support means.

4. The wide-band vibration damper of claim 1, wherein the damping factor of the damping material means is substantially equal to the termination impedance of the solid vibration conductor means.

5. The wide-band vibration damper of claim 1, wherein said solid vibration conductor means comprise contiguous linear horn members fastened to the solid body to be damped, whereby the stiffness of the overall structure is increased.

6. The wide-band vibration damper of claim 1, wherein for peaking the impedance at given frequencies, the vibration in the solid vibration conductor means is attenuated only incompletely.

7. The wide-band vibration damper of claim 6, further comprising intermediate masses attached to the solid vibration conductor means.

8. The wide-band vibration damper of claim 6, wherein stiffness steps are provided in the solid vibration conductor means.

9. The wide-band vibration damper of claim 6, wherein for eliminating intercoupling in the case of curved solid vibration conductor means, the latter comprise two horn members with mutual mirror-symmetry which are joined together with a narrow horn end to a broad horn end and vice versa.

10. The wide-band vibration damper of claim 6, wherein for eliminating intercoupling, the solid vibration conductor means comprise four helical horn members which are symmetrically joined together along two axes.

11. The wide-band vibration damper of claim 6, further comprising end masses attached to the solid vibration conductor means.

12. The wide-band vibration damper of claim 1, wherein said solid vibration conductor means comprise contiguous areal horn members fastened to the solid body to be damped, whereby the stiffness of the overall structure is increased.

13. The wide-band vibration damper of claim 1, wherein said solid vibration conductor means comprise a solid horn member made of flat, solid stock and extending substantially in parallel to said solid body to be damped whereby both ends of said solid horn member are connected to said solid body to be damped.

14. The wide-band vibration damper of claim 1, wherein said solid vibration conductor means comprise a horn member made of a solid rod twisted into a curved shape.

15. The wide-band vibration damper of claim 1, wherein said solid vibration conductor means comprise a solid horn member made of a flat metal piece with slots therein so that said narrow end of the solid horn member is formed directly within the broad end of the solid horn member, and wherein said damping material means connect said narrow horn end to the broad horn end through said slots.

16. The wide-band vibration damper of claim 1, wherein said solid vibration conductor means comprise two solid horn members each twisted into a respective helix which fits into the corresponding other helix.

17. The wide-band vibration damper of claim 1, wherein said solid vibration conductor means comprise a plurality of elongated solid horn members each having a ridge extending along the entire length of the respective horn member, said ridge forming the narrow horn end, each horn member further having a foot also extending along the entire length of the respective horn member, said foot forming the broad horn end, said plurality of horn members being arranged in intersecting fashion whereby the ridges form a grid pattern.

18. The wide-band vibration damper of claim 1, wherein said solid vibration conductor means comprise a solid horn member arranged in a number of meandering loops.

19. The wide-band vibration damper of claim 18, wherein said meandering loops have solid material legs which are wider adjacent said broad horn end and narrower adjacent said narrower horn end, said meandering legs forming gaps therebetween.

20. The wide-band vibration damper of claim 19, wherein said damping material connects the free end of the narrowest meandering loop leg to said support means.

21. The wide-band vibration damper of claim 20, comprising further damping material in which the entire solid horn member is embedded thereby filling the gaps between said legs and covering the solid horn member.

22. A wide-band vibration damper for reducing sound propagation in fluid conduits comprising a plurality of coaxially arranged horn members, first and second fluid conduit means and housing means operatively interconnecting said first and second conduit means, said horn members being operatively disposed in said housing means so that gaps are formed between adjacent horn members, said gaps alternately tapering in opposite directions, whereby at least one tapering gap is formed between said conduit means and the horn member of smallest diameter and a further tapering gap is formed between said smallest diameter horn member and a horn member having the next larger diameter.

* * * * *